Figure 1:
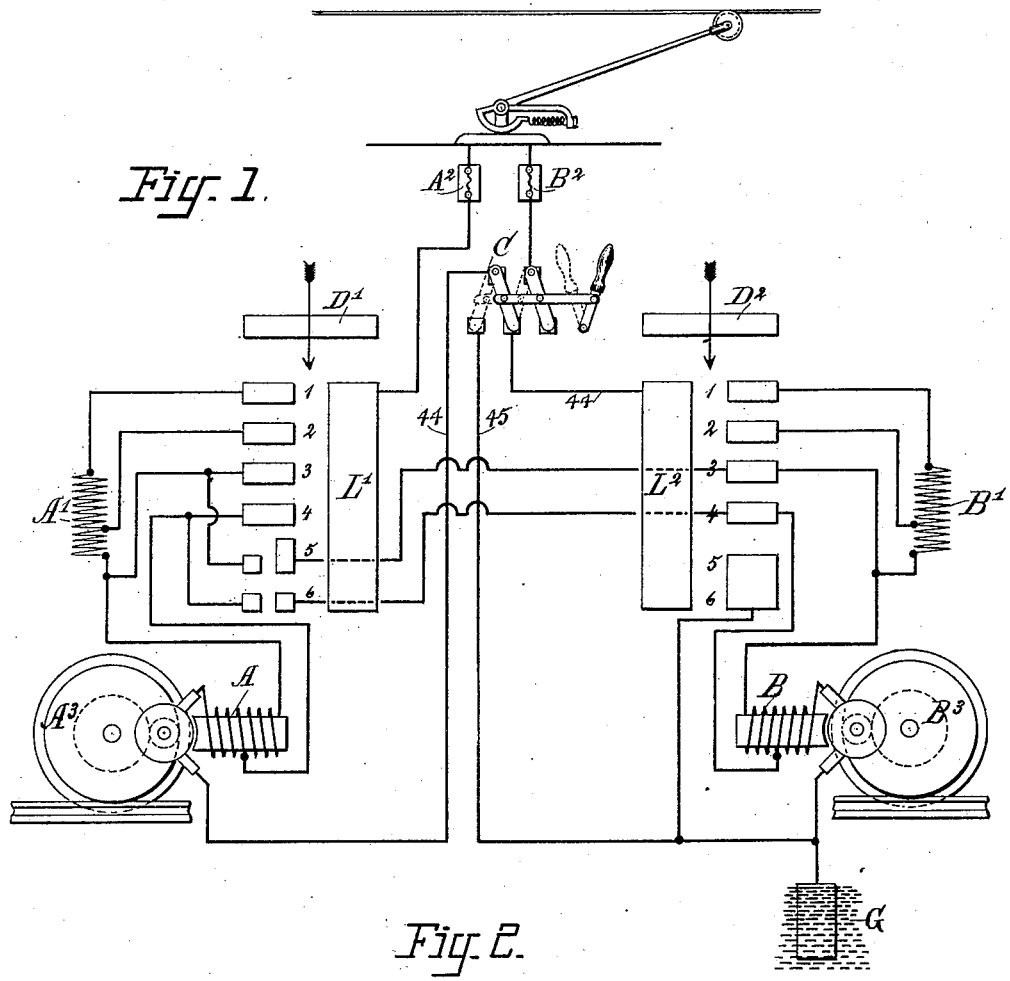

(No Model.) 2 Sheets—Sheet 1.
M. J. WIGHTMAN & O. URBAN.
CONTROLLER FOR ELECTRIC MOTORS.

No. 549,621. Patented Nov. 12, 1895.

ATTEST:
Henry T. Hirsch.
Wm. N. Capel

INVENTORS:
Merle J. Wightman,
Oscar Urban.
by H. A. Townsend
ATTORNEY.

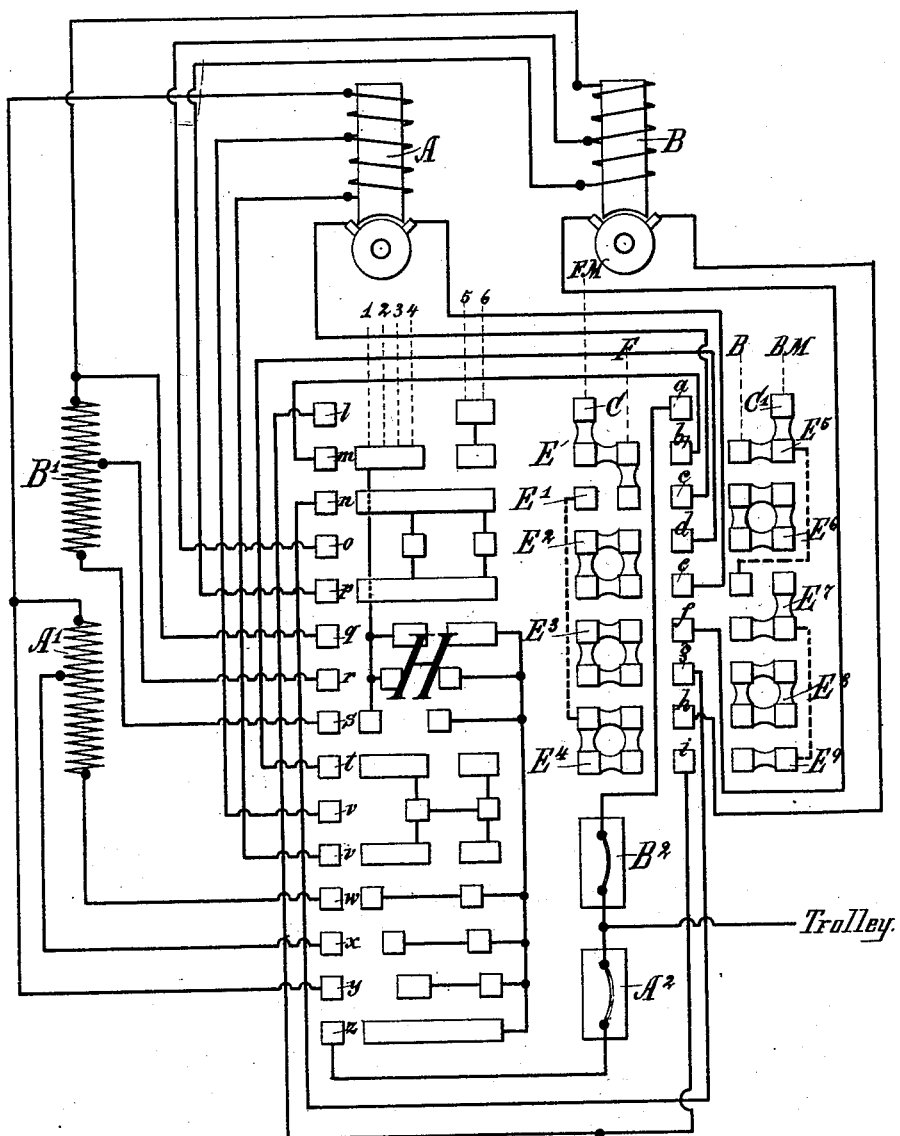

UNITED STATES PATENT OFFICE.

MERLE J. WIGHTMAN AND OSCAR URBAN, OF SCRANTON, PENNSYLVANIA.

CONTROLLER FOR ELECTRIC MOTORS.

SPECIFICATION forming part of Letters Patent No. 549,621, dated November 12, 1895.

Application filed February 6, 1895. Serial No. 537,503. (No model.)

*To all whom it may concern:*

Be it known that we, MERLE J. WIGHTMAN and OSCAR URBAN, citizens of the United States, and residents of Scranton, in the county of Lackawanna and State of Pennsylvania, have invented a certain new and useful Controller for Electric Motors, of which the following is a specification.

Our invention relates to electric motors operated and controlled on what is known as the "series-multiple" system, and is designed to overcome certain difficulties incident to the use thereof from inequalities in the distribution of the load between the two motors.

The invention is especially useful for street-railway cars wherein each of the two motors governed by the series-multiple controller is connected to a separate axle of the car. In this as in other cases where the resistance of the two motors to rotation is subject to inequality, or, in other words, in any case where there is liability to an unequal distribution of the load on the motors, a difficulty arises with the ordinary series-multiple controller, especially in the case of electric-railway motors when the tracks are covered with snow and ice. The difficulty is due to the fact that the friction between the wheels and the track is different in the case of the two motors. When one pair of wheels on the car commences to slip, the coefficient of friction becomes reduced and that pair of wheels continues slipping and the motor propelling them increases its speed beyond that of the other motor. This increase of speed of one motor over the other causes an increase of the electromotive force generated by that motor. This counter electromotive force tends to cut down the current sometimes to such a point that the motor mounted on the wheels having the highest friction or adhesion of the wheels to the rails stops running altogether—that is, the torque of the motor is cut down at the moment it is most needed. It has been found in practice that a car equipped with the ordinary series-multiple controller cannot climb a very slight grade when the friction of the wheels has been greatly reduced either by snow or mud. The grip or adhesion to the rails shifts alternately from one pair of wheels to the other.

The object of our invention is to overcome the above-named difficulty, to which end the invention consists, essentially, in the combination, with the two motors and their series-multiple controller, of suitable switch devices and connections whereby when necessary the motors may be operated in multiple and may be each governed in its operation by the variation of a suitable resistance in its own branch, or by otherwise controlling its action, as well understood in the art.

By preference we utilize for the purpose of controlling each motor in its new relation the same rheostatic resistance that is used while they are operated in their series relation, although, as will be well understood by electricians, an independent rheostatic resistance may be employed if desired. It is preferable, however, to utilize the rheostatic resistance of the series-multiple controller which operates to produce the initial changes of action by cutting out the resistance of the motors while run in series.

A further advantage is secured by our invention in that when the motors are operated according to the multiple method of control they are connected in independent circuits, and the failure of one motor in no wise interferes with the other.

Another feature of our invention consists in changing the connection of the motors and the controller to a simple multiple connection by the use of supplemental switch-contacts operated by moving the reversing-switch.

Figure 2:
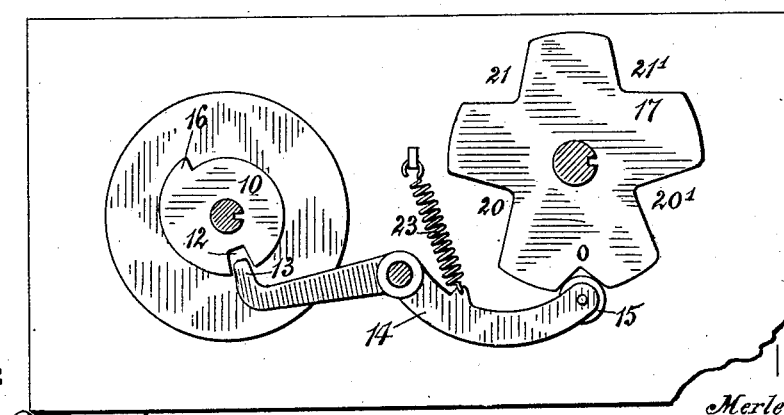

In the accompanying drawings, Figure 1 is a simplified diagram illustrating an arrangement embodying our invention. Fig. 2 illustrates a mechanical detail of the apparatus. Fig. 3 illustrates diagrammatically our invention as applied to a complete system of switch-contacts for a multiple-series controller of the form at present in use.

Referring to Fig. 1, $A^2 B^2$ are fuses or safety-catches of any ordinary description, while $A'$ $B'$ represent rheostats which regulate the flow of current to the motors A B, respectively.

$A^3 B^3$ show in outline the car-wheels with the axles of which said motors are respectively geared.

Two sets of contacts, one for each motor, are designated at 1 2 3 4 5 6, the said numbers corresponding in order to the various positions that may be taken upon said series of contacts by two contacts D' D², one for each motor, which slide over the fixed contacts 1 to 6, and while doing so engage, also, with the elongated contact-plates L' L², respectively. The contacts D' D² are insulated from one another and operate simultaneously.

C is a switch in the series connection 44 between the two motors, and 45 is a direct connection from the motor A to the return, which connection is governed by said switch. Fuse or cut-out B² connects directly with one of the switch-arms of C, as shown. With the switch C in the position indicated in the diagram, it will be readily seen from following the connections that as the contacts D' D² move over the contacts from 1 to 6, inclusive, the motors will remain coupled up in series until after the contacts D' D² pass position No. 4, and that in moving to such position they will first include the motors in series with all the resistances A' B' in circuit, will in the next position cut out a section of each of said resistances, will in the next position cut out all of the resistance, leaving the two motors connected simply in series, and in the next position, which is the No. 4 position, will still retain the motors in series with one another, but with a section of field-winding of each cut out. At position No. 5 the motors will be coupled in multiple with all of the field-winding in circuit, and at position of contact 6 both motors will be in multiple with a portion of the field-winding of each cut out. If the switch C be turned to the left, it will be seen that the motors are connected permanently in multiple, and fuse B², which was formerly not in circuit at all, is now in series with motor B. When now the contacts D' D² of the switch are moved over the series of contacts 1 to 4, each motor will be governed in its action through the variations of resistance therein or change in the number of its field-windings and will act in response to such controlling operation of the controller without reference to the behavior of the other, each motor being now unaffected by any variations in the counter electromotive force of the other due to change of speed. As will be seen, each is operated entirely independent of the other and the difficulty before experienced will be avoided.

Should any fault arise in the wiring or winding of one of the motors, it is evident that only that motor will be affected, and in case of the short circuit the fuse in the faulty circuit will be blown out. This coupling, therefore, does away with the usual switch for cutting out either one motor or another, as hitherto employed in street-railway-motor controllers.

It will be understood that the various parts shown are typical of any switch; but the mechanical construction of the parts or the manner of mounting them so that the relative movement described may be produced being well understood in the art need not be set forth with greater particularity.

The application of our invention to an arrangement of series-multiple-controller contacts employed in practice is illustrated diagrammatically in Fig. 3. The set of contacts ordinarily arranged on the surface of a controlling-cylinder under the control of the motorman is indicated at H. The construction and arrangement of this cylinder being well understood in the art need not be here described. It will be understood, however, that what is here shown is merely typical of any series-multiple controller, and that the invention is not alone applicable to the particular arrangement shown. The cut-outs or fuses B² A² (shown in the preceding diagram) are also indicated in this figure. The movement of the controlling-cylinder carrying contacts H is supposed to be such as to move them transversely crosswise of the diagram, so as to set the series into the six different positions indicated by the dotted lines 1 2 3 4 5 6 corresponding to the various positions shown in the preceding figure, in which said positions the range of contacts H will engage with various ones of the fixed contacts or connections lettered from $l$ to $z$, inclusive.

E E' E² E³ E⁴ are contacts on the surface of the usual reversing-switch cylinder, and E⁵ E⁶ E⁷ E⁸ E⁹ is a similar series on the same cylinder. Both series are arranged to make contact with fixed contacts $a$ to $i$, inclusive, upon rotation of said cylinder.

In the usual practice the reversing-switch is only provided with the contacts $b$ to $i$, inclusive, with which contacts E to E⁴ make connection in one position of the switch-cylinder—as, for instance, in turning from left to right—while in the other position, or in turning from right to left, the other set of contacts E⁵ to E⁹, inclusive, make connection with said fixed contacts. These two positions are the ones assumed according to the direction of rotation of the motors desired.

The change of connections provided by the switch C of Fig. 1 is in this diagram, Fig. 3, provided by the extra contact $a$. In this modified reversing-switch we provide two steps to the right to positions indicated by vertical lines B and B M and two to the left—to wit, those indicated by the vertical lines F and F M. The contact $a$ is connected directly to the fuse B², and by following the diagram it will be seen that when the reversing-cylinder is moved one step to the right or left—that is, to make connection with contacts on the line F or B—contact $a$ is not engaged; but on a movement two notches or steps the contact E or E⁵, by an extension of it upward on the line F M or B M, will engage with the contact $a$, and by following the connections thus obtained it will be found that the same result is produced as by moving the switch C in Fig. 1 to the left.

When the stationary contacts of the reversing-switch engage with the movable contacts on the line F or B, rotation of the controlling-cylinder whose contacts are typified at H will produce a series of connections, the first of which includes the two motors and all the resistance B' A' in series; second, the connection of them in series with a portion of the resistance cut out; third, the same connection with all the artificial resistance cut out; fourth, the connection of them in series with a portion of the field-winding of each cut out; fifth, motor A entirely cut out of circuit for an instant, and, sixth, motors connected in multiple. These operations or changes of connection are thus produced by one form and connection of contacts in a series-multiple switch. By throwing the reversing-switch, however, sufficiently far to cause the line of contacts F M or B M to rest on the line of contacts $a$ to $i$, inclusive, the motors will be connected permanently in multiple, and in this case the movement of the controller whose contacts are represented at H to the various positions 1 to 4, inclusive, will produce the same change of resistance in each multiple-arc branch in which the motors, respectively, are included, and the same change of connection in the field of each as when they were operated in series; but the change of electrical condition and connection of each will now be produced independently of any variations of electromotive force of the other due to abnormal change of its load.

Simultaneously with the change of the switch to change the connections of the motors from series to multiple arc, an automatic stop operated by movement of the switch itself may be interposed to prevent rotation of the series-multiple controlling devices beyond the position No. 4. Such a device is typified in Fig. 2, wherein 10 is a locking-disk fastened to the spindle or other portion of the controller so as to rotate with the controller-cylinder when the latter is manipulated by the usual handle, and 13 is a dog or stop on the end of the lever 14, which dog is adapted to enter a notch 12 in the disk 10 only when the controller-cylinder is thrown to the "off" position. Lever 14 carries at its opposite end the roller 15, adapted to engage with a notched disk 17, which latter is attached to the rotary reversing-switch so as to rotate therewith. The notch marked zero is that corresponding to the position of the reversing-switch when the circuit is broken therethrough and in this position of the parts the dog 13 enters the notch 12 and locks the controller. In the disk 17 are two rather deep notches 20 and 20', into which the roller 15 may enter and thereby withdraw the dog 13, so as to allow the controller-cylinder and disk 10 to rotate freely from the position "off" through all the changes of circuit from 1 to 6, inclusive.

23 is a suitable spring applied to the lever 14 so as to operate the latter when permitted by the disk 17. The notch 20 corresponds to one position of the reversing-switch, suitable for allowing the car to go ahead, and the notch 20' to the opposite position, suitable for allowing the reverse movement.

21 and 21' indicate two other notches in the disk 17, not quite so deep as those indicated at 20 and 20', but sufficiently deep to allow the dog 13 to unlock the disk 10. When the disk is unlocked, however, by the roller 15 resting in either of the notches 21 21', the dog will nevertheless be in such position as to be engaged by the projection 16, which is properly arranged to limit the movement of the controller-cylinder at the No. 4 change of position and not allow it to go beyond that position. Notch 21 is arranged to correspond with that position of the reversing-switch which puts the circuits into simple multiple condition and with the current passing in one direction through the motors, while notch 21' corresponds to the similar simple multiple condition in which the current flows in the opposite direction, or reverses the motor.

When the controller is rotated, say, from the position where the dog 13 may pass into the notch 12, no movement of the reversing-switch will be permitted, since the roller cannot pass over the projections of the disk 17, owing to the fact that the dog 13 will engage with the disk 10. It is therefore necessary in all cases to return the controller to the position "off," where the dog 13 will be opposite the notch 12. In this position the dog may enter the notch sufficiently to allow rotation of the reversing-switch to the desired position.

As will be obvious, when the controller is in the zero or "off" position the reversing-switch may be rotated from any position to any other position desired. The usual limiting-stop is of course provided to prevent complete rotation of the controller and oblige the operator to return it by a reverse movement to the zero or "off" position.

What we claim as our invention is—

1. The combination with two electric motors and their multiple series controller, of a switch and connections whereby said motors may be run in multiple each with its own controller resistance or other means for governing its operation.

2. The combination with two electric motors, of a series multiple controller, a reversing switch, and supplemental contacts and connections on the latter for changing the connections of the motors for operation and control in multiple, as and for the purpose described.

3. The combination with a series multiple controller and the motors governed thereby, of a variable resistance, and a switch for changing the motors to a permanent multiple arc connection with a part of said variable resistance in each branch.

4. The combination, substantially as described, of two electric motors, a series multiple controller, and a switch for breaking the series connection of said motors and connecting them in multiple each with a part of said controller adapted to vary the action of the motors.

5. The combination, substantially as described, of a series multiple controller, a reversing switch, and an automatic stop governed by the latter for limiting the movement of the controller.

6. The combination with two electric motors coupled in series and a double controller for governing the resistance in the circuit of each motor while thus coupled, of means for breaking the series connection between them and coupling them in multiple to allow each portion of the controller to operate upon its motor independently of the other.

7. The combination with electric motors, of a series multiple controller, a switch for changing the connection of the motors for operation and control in multiple, and an automatic lock governed by the series multiple controller for locking the switch excepting when the said controller is restored to "off" position.

8. The combination, substantially as described, of a series multiple controller, a switch for changing the connections of the devices controlled for operation and control in multiple, and an automatic stop governed by said switch for limiting the throw of the controller.

9. The combination with the series multiple controller, of a switch for throwing motors into multiple, and an automatic stop for limiting the throw of the controller when operated to control the motors in multiple.

In testimony whereof we have affixed our signatures in presence of witnesses.

MERLE J. WIGHTMAN.
OSCAR URBAN.

Witnesses as to signature of Merle J. Wightman:
J. L. CHAPMAN,
R. E. GLASS.

Witnesses as to signature of Oscar Urban:
CHARLES HORTON SMITH,
V. L. MALES.